United States Patent [19]

Genrikh et al.

[11] 4,119,866
[45] Oct. 10, 1978

[54] HIGH VOLTAGE ELECTRICAL NETWORK WITH DC ICE-MELTING DEVICE AND CURRENT RETURN THROUGH GROUND

[76] Inventors: Georgy Andreevich Genrikh, ulitsa Chekistov, 10, kv. 3; Leonid Alexeevich Nikonets, ulitsa Khasanskaya, 8, kv. 4; Petr Romanovich Khrusch, ulitsa P. Morozova, 4, kv. 3, all of Lvov; Dmitry Korneevich Kovalenko, ulitsa Pushkina, 183, kv. 9, Kustanai; Valentin Ivanovich Sidorov, Komsomolskaya ulitsa, 33, kv. 6, Kustanai; Jury Nikolaevich Belozerov, ulitsa Tafana, 161, kv. 13, Kustanai; Evgeny Vasilievich Gorelin, ulitsa Lenina, 38, kv. 42, Kustanai, all of U.S.S.R.

[21] Appl. No.: 768,288

[22] Filed: Feb. 14, 1977

[51] Int. Cl.$^2$ ............................................. H02J 11/00
[52] U.S. Cl. ..................................... 307/147; 219/209
[58] Field of Search ................ 307/147, 112; 219/209; 340/234

[56] References Cited
U.S. PATENT DOCUMENTS 2,240,772  5/1941  Hampe et al. ..................... 307/147

*Primary Examiner*—Robert K. Schaefer
*Assistant Examiner*—Morris Ginsburg
*Attorney, Agent, or Firm*—Lackenbach, Lilling & Siegel

[57] ABSTRACT

A high-voltage electrical network comprises neutral conductors, at least two of them being grounded, and at least two ground circuits, at least one of them being connected to a neutral conductor and functioning as a first operational grounding means which is a part of a circuit for melting the icing by direct current on one of the lines of the high-voltage electrical network. The ice melting circuit is also provided with at least one more series-connected operational grounding means, a heated circuit of a high-voltage electrical network, a device for melting the icing by direct current on one of the lines of the high-voltage electrical network and a ground used as a return conductor. The high-voltage electrical network, additionally comprises at least one device, for preventing the direct current from flowing to the neutral conductors of the high-voltage electrical network, connected to one of the neutral conductors, coupled to one of the ground circuits used as an operational grounding means and forming a part of a circuit for melting the icing on one of the lines of the high-voltage electrical network by direct current, and to the same ground circuit.

20 Claims, 16 Drawing Figures

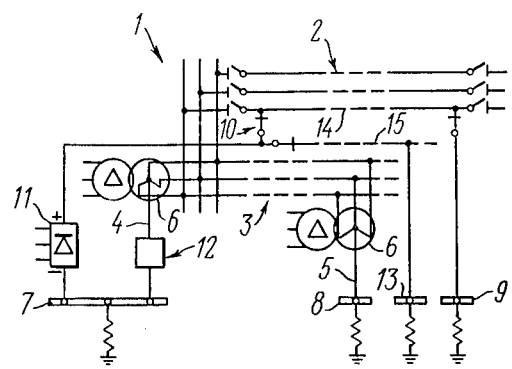
FIG. 4
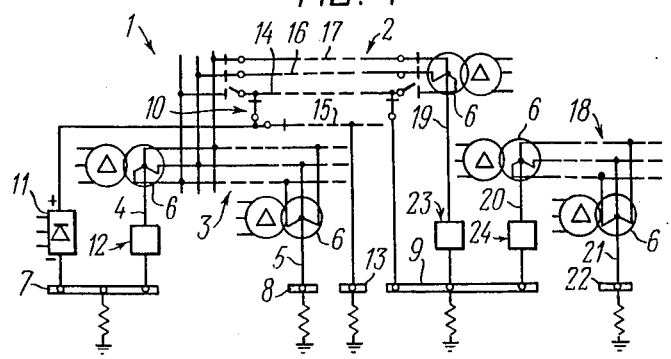
FIG 5
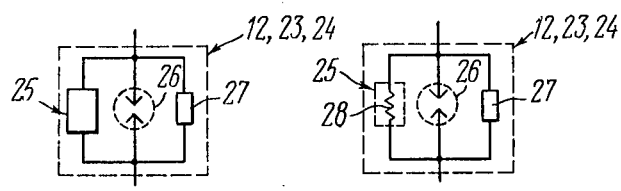 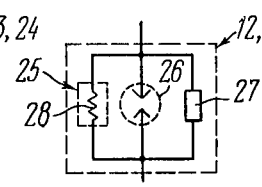
FIG. 6　　　　　　FIG. 7
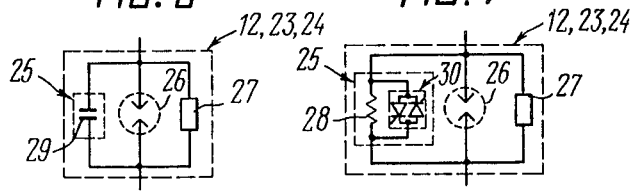 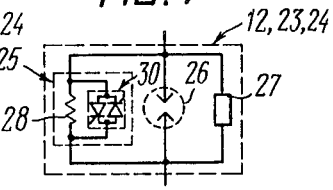
FIG. 8　　　　　　FIG. 9

HIGH VOLTAGE ELECTRICAL NETWORK WITH DC ICE-MELTING DEVICE AND CURRENT RETURN THROUGH GROUND

FIELD OF THE INVENTION

This invention relates to electric power engineering and, in particular, to a high-voltage electrical network and can be employed in electrical power engineering to prevent direct current from flowing through dead grounded neutral wires to an AC high-voltage electrical network. This high-voltage electrical network may comprise powerful rectifier installations, devices for melting the icing, and DC power transmission stations.

DESCRIPTION OF THE PRIOR ART

There is known a high-voltage electrical network provided with a grounded neutral wire, wherein several neutral wires are coupled to several ground circuits. This high-voltage electrical network comprises a direct current device for melting the icing on one of the disconnected lines of this network. The ice melting circuit of such a high-voltage electrical network includes conductors of heated lines, which are joined in "wire-wire" and "two wires-wire" circuits, and an ice melting device (high-voltage rectifier). The ice melting device is connected by one of its poles to the ground circuit of the substation so that the melting current does not flow in this ground circuit. Since the melting direct current does not flow through the ground circuits, to which neutral wires of the high-voltage electrical network are connected, this current does not flow to the high-voltage network through its dead ground neutral wires. However, the ground cannot be used as a return conductor and ice melting in such a high-voltage electrical network is only possible on a comparatively small part of the lines. The efficiency of DC ice melting, therefore, is insufficient in such a high-voltage electrical network, as well as it not being sufficiently reliable in operation.

Known in the art is a high-voltage electrical network comprising several neutral wires, at least two of them being grounded, and ground circuits coupled to the neutral wires. This high-voltage electrical network also comprises a DC device for melting the icing on one of the disconnected lines of this network. This DC ice melting circuit for one of the disconnected lines of the high-voltage electrical network comprises a series-connected heated circuit of the high-voltage electrical network, a DC device for melting the icing on one of the lines of the high-voltage electrical network and a ground used as a return wire. The wires of heated transmission lines are joined in "wire-to-wire" and "two wires-to-wire" circuits, as well as in circuits where ground is used as a return wire ("wire-to-ground," "two wires-to-ground").

In such a high-voltage electrical network icing can be melted on much longer lines as compared to high-voltage electrical networks, where ground is not used as a return wire for direct current ice melting. To prevent the direct current from flowing through dead grounded neutral wires of such a high-voltage electrical network, the DC ice melting circuit comprises external ground circuits which are used as operational grounding means. Such external ground circuits rated for the powerful direct current flow required for melting the icing on the line of a high-voltage electrical network are complicated and expensive to manufacture.

SUMMARY OF THE INVENTION

It is an object of this invention to increase the efficiency of melting the icing on lines of a high-voltage electrical network by direct current and the reliability of network operation during melting.

This is achieved by a high-voltage network which includes neutral conductors, at least two of said conductors being grounded, at least two ground circuits, at least one of said circuits being connected to one neutral conductor and functioning as a first operational grounding means which is a part of a circuit for melting the icing on one of the lines of the high-voltage electrical network by direct current, at least one more series-connected operational grounding means, a heated circuit of the high-voltage electrical network, a device for melting the icing by direct current on one of the lines of the high-voltage electrical network and a ground used as a return conductor. According to the invention, the device additionally comprises at least one device for preventing the direct current from flowing to the neutral conductor of the high-voltage electrical network, which is connected to one of the neutral conductors, coupled to one of the ground circuits used as an operating grounding means which is a part of the circuit for melting the icing by direct current on one line of the high-voltage electrical network, and to the same ground circuit.

It is advisable that the device for preventing the direct current from flowing to the neutral conductors of the high-voltage electrical network comprise parallel-connected direct current limiting means, a discharger limiting the neutral conductor voltage and a switching apparatus which guards the discharger against breakdown during operation.

It is also advisable, if limitation of the direct current flowing through the neutral conductors is sufficient in order to increase the reliability of the operation of the high-voltage electrical network during ice melting, that the direct current limiting means comprise a main resistance.

It is advisable that the direct current limiting means include a capacitor, if flowing of the direct current to the neutral conductors cannot be tolerated in order to ensure reliable operation of the high-voltage electrical network during ice melting by direct current.

It is also advisable that, in order to simplify and increase the efficiency of the device for preventing the direct current from flowing to the neutral conductors of the high-voltage electrical network, the direct current limiting means comprise additionally a thyristor contactor connected parallel to the main resistance or the capacitor and limiting the voltage on the main resistance or capacitor.

It is also advisable that the direct current limiting means be provided with an additional resistance connected in series with the thyristor contactor and limiting the discharge current of the capacitor in order to increase the reliability of operation of said capacitor and said thyristor contactor, if the direct current limiting means comprises the capacitor.

It is advisable, in order to ensure thermal stability of the thyristor contactor, that the direct current limiting means additionally comprise a fuse connected to the neutral conductor and to the main effective resistance or the capacitor.

It is quite advisable, in order to ensure proper operation of the device for preventing direct current from flowing to the neutral conductors in emergency conditions, that it comprise additionally a current sensor which is electrically connected by one primary tapping to the discharger, by a second primary tapping to the switching apparatus and the direct current limiting means and by secondary tappings to the drive of the switching apparatus and which supplies a signal for operation of the switching apparatus.

It is also quite advisable, in order to ensure emergency conditions operation of the device for preventing direct current from flowing to the neutral conductors, that the device for preventing comprises a thyristor contactor in the direct current limiting means and that the current sensor be electrically connected by its one primary tapping to the thyristor contactor.

Ice melting by direct current in the above described high-voltage electrical network is more efficient as compared to the known networks and this increases the reliability of operation of the high-voltage electrical network. This can be accounted for by the fact that the ground circuits of the substations are used as operational grounding means and this permits a significantly wider range of lengths of heated lines by employing melting circuits, wherein the ground is used as a return conductor. Besides, elimination of external operational grounding means effects quite a saving in construction costs when building ice melting installations.

BRIEF DESCRIPTION OF THE DRAWINGS

The invention will now be described with reference to specific embodiments thereof, taken in conjunction with the accompanying drawings, wherein:

FIG. 4 shows a schematic diagram of a fourth embodiment of a high-voltage electrical network, according to the invention;

FIG. 5 shows a schematic diagram of a fifth embodiment of a high-voltage electrical network, according to the invention;

FIG. 6 shows a schematic diagram of a device for preventing the direct current from flowing to the neutral conductors, according to the invention;

FIG. 7 shows a schematic diagram of another embodiment of the device for preventing the direct current from flowing to the neutral conductors, according to the invention;

FIG. 8 shows a schematic diagram of a third embodiment of the device for preventing the direct current from flowing to the neutral conductors, according to the invention;

FIG. 9 shows a schematic diagram of a fourth embodiment of the device for preventing the direct current from flowing to the neutral conductors, according to the invention;

DETAILED DESCRIPTION OF THE INVENTION

Figure 1:
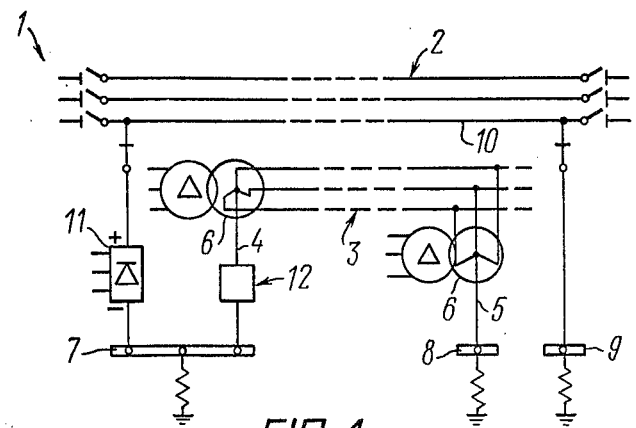
FIG. 1 shows a schematic diagram of a high-voltage electrical network, according to the invention.

Referring to FIG. 1, a high-voltage electrical network 1 comprises a line 2 disconnected from power supply sources and consumers (not shown) for ice melting and an operating line 3. Two neutral conductors 4 and 5 are joined to the line 3, each conductor being grounded. Transformers 6 are also joined to the line 3. The high-voltage electrical network 1 also comprises a ground circuit 7, a ground circuit 8 and a ground circuit 9. The ground circuit 7 is connected to the neutral conductor 4. The ground circuit 8 is connected to the neutral conductor 5. The ground circuit 7 and the ground circuit 9 are elements of the circuit for melting the icing by direct current on the line of the high-voltage electrical network and serve as first and second operational grounding means. The direct current ice melting circuit of the line of the high-voltage electrical network is also provided with the following series-connected elements a heated conductor 10 of the line 2 of the high-voltage electrical network 1, a device 11 for melting the icing on the line of the high-voltage electrical network by direct current and ground used as a return conductor. The high-voltage electrical network 1 also comprises a device 12 for preventing the direct current from flowing to the neutral conductors of the high-voltage electrical network, which is connected to the neutral conductor 4 joined to the ground circuit 7 used as the first operational grounding means. The device 12 for preventing the direct current from flowing to the neutral conductors of the high-voltage electrical network is also connected to the ground circuit 7.

Figure 2:
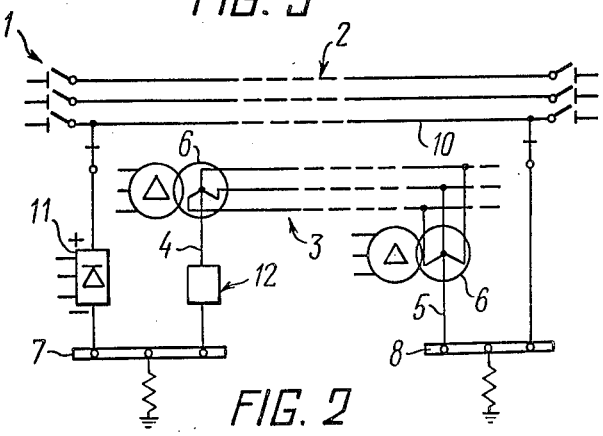
FIG. 2 shows a schematic diagram of another embodiment of a high-voltage electrical network, according to the invention.

When direct current ice melting is performed in a high-voltage electrical network 1 (FIG. 2) equipped with only two ground circuits 7 and 8, they are used both as operational grounding means. The two neutral conductors 4 and 5 are connected to the line 3 and grounded. The ground circuit 7 is connected to the neutral conductor 4 and the ground circuit 8 is connected to the neutral conductor 5. The ground circuit 7 and the ground circuit 8 are parts of the circuit for melting the icing by direct current on the line of the high-voltage network. In this case the direct current circuit for melting the icing on the high-voltage electrical network line is also equipped with the following series-connected elements a heated circuit or conductor 10 of the line 2 of the high-voltage electrical network 1, a device 11 for melting the icing by direct current on the line of the high-voltage electrical network and a ground used as a return conductor. The high-voltage electrical network 1 also comprises a device 12 for preventing the direct current from flowing to the neutral conductors of the high-voltage electrical network, which is connected to the neutral conductor 4 joined to the ground circuit 7 used as the first operational grounding means. The device 12 for preventing the direct current from flowing to the neutral conductors of the high-voltage electrical network is also connected to the ground circuit 7.

Figure 3:
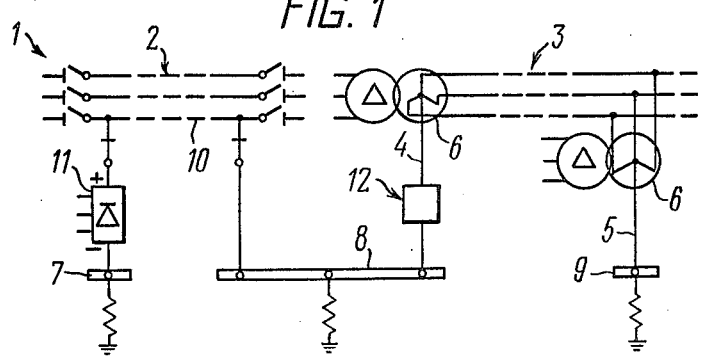
FIG. 3 shows a schematic diagram of a third embodiment of a high-voltage electrical network, according to the invention.

The high-voltage electrical network of FIG. 3 comprises three ground circuits 7, 8 and 9. Two neutral conductors 4 and 5 are grounded and connected to the line 3. The ground circuit 8 is connected to the neutral conductor 4 and the ground circuit 9 is connected to the neutral conductor 5. The circuit for melting the icing by direct current on the line of the high-voltage electrical network comprises the ground circuit 7 and the ground circuit 8, which serve as a first and a second operational grounding means. The circuit for melting the icing by direct current on the line of the high-voltage electrical network also comprises the following series-connected elements a heated conductor 10 of the line 2 of the high-voltage electrical network 1, a device 11 for melting the icing on the line of the high-voltage electrical network by direct current and a ground used as a return conductor. The device 11 for melting the icing by direct current on the line of the high-voltage electrical network is connected to the ground circuit 7 used as the first operational grounding means. Neutral conductors are not connected to this ground circuit 7. Nevertheless, since the neutral conductor 4 is connected to the ground circuit 8 used as the second operational grounding means, this neutral conductor is coupled to the device 12 for preventing the direct current from flowing to the neutral conductors of the high-voltage electrical network. This device 12 for preventing the direct current from flowing to the neutral conductors of the high-voltage electrical network is also coupled to the ground circuit 8.

Referring to FIG. 4, the fourth embodiment of the high-voltage electrical network 1 comprises four ground circuits 7, 8, 9 and 13. The ground circuit 7 is connected to the neutral conductor 4 joined to the line 3 and the ground circuit 8 is connected to the neutral conductor 5 also joined to the line 3. The ground circuits 7, 9 and 13 are elements of the circuit for melting the icing by direct current on the line of the high-voltage electrical network and serve as operational grounding means. The circuit for melting the icing by direct current on the line of the high-voltage electrical network also comprises the following series-connected elements a heated circuit 10 of the line 2 of the high-voltage electrical network 1, a device 11 for melting the icing by direct current on the line of the high-voltage electrical network and a ground used as a return conductor. In the disclosed embodiment of the high-voltage electrical network 1 the heated circuit 10 of the line 2 of the high-voltage electrical network 1 comprises a conductor 14 and a lightning protection cable 15. The high-voltage electrical network 1 also comprises the device 12 for preventing the direct current from flowing to the neutral conductors of the high-voltage electrical network, which is coupled to the neutral conductor 4 connected to the ground circuit 7 used as one of the operational grounding means. This device 12 for preventing the direct current from flowing to neutrals of the high-voltage electrical network is connected to the ground circuit 7.

Referring to FIG. 5, the fifth embodiment of the high-voltage electrical network comprises a line 2 which is partially disconnected in order to melt the icing on a disconnected conductor 14. Two other conductors 16 and 17 of this line remain operating. The high-voltage electrical network 1 also comprises operating lines 3 and 18 and neutral conductors 4, 5, 19, 20 and 21, each conductor being grounded. The neutral conductors 4 and 5 are connected to the line 3, the neutral conductor 19 is connected to the line 2, and the neutral conductors 20 and 21 are connected to the line 18. The high-voltage electrical network 1 features five ground circuits 7, 8, 9, 13 and 22. The ground circuit 7 is connected to the neutral conductor 4, the ground circuit 8 is connected to the neutral conductor 5, the ground circuit 9 is connected to the neutral conductors 19 and 20, and the ground circuit 22 is connected to the neutral conductor 21. The ground circuits 7, 9 and 13 are elements of the circuit for melting the icing on the line 2 of the high-voltage electrical network and serve as operational grounding means. The circuit for melting the icing by direct current on the line of the high-voltage electrical network also comprises the following series-connected elements a heated circuit 10 of the line 2 of the high-voltage electrical network 1, a device 11 for melting the icing by direct current on the line of the high-voltage electrical network and a ground used as a return conductor. The heated circuit 10 of the line 2 of the high-voltage electrical network 1 in this case comprises a disconnected conductor 14 and a lightning protection cable 15 of the line. The high-voltage electrical network 1 also comprises three devices 12, 23 and 24 for preventing the direct current from flowing to the neutral conductors of the high-voltage electrical network. The device 12 for preventing the direct current from flowing to the neutral conductors of the high-voltage electrical network is connected to the neutral conductor 4 joined to the ground circuit 7 used as the first operational grounding means and to this ground circuit 7. The device 23 for preventing the direct current from flowing to the neutral conductors of the high-voltage electrical network is connected to the neutral conductor 19 joined to the ground circuit 9 used as the second operational grounding means and to this ground circuit 9. The device 24 for preventing the direct current from flowing to the neutral conductors of the high-voltage electrical network is connected to the neutral conductor 20 joined to the ground circuit 9 used as the second operational grounding means and to this ground circuit 9.

FIG. 6 illustrates diagrams of devices 12, 23 and 24 for preventing the direct current from flowing to the neutral conductors of the high-voltage electrical network. Each of the devices 12, 23 and 24 for preventing the direct current from flowing to the neutral conductors of the high-voltage electrical network comprises the following parallel-connected elements a direct current limiting means 25, a discharger 26 limiting the voltage of the neutral conductor and a switching apparatus 27 preventing breakdown of the discharger 26 during operation.

When limitation of the direct current flowing to the neutral conductor is sufficient to ensure greater operational reliability of the high-voltage electrical network 1 during ice melting, the second embodiment of the device 12, 23, 24 for preventing the direct current from flowing to the neutral conductors is used. In this case the direct current limiting means 25 (FIG. 7) comprises a main resistance 28. The direct current limiting means 25 provided with the main resistance 28, the discharger 26 and the switching apparatus 27 are connected in parallel.

When flowing of the direct current to the neutral conductors cannot be tolerated in order to ensure reliable operation of the high-voltage electrical network during ice melting, in the devices 12, 23, 24 for preventing the direct current from flowing to the neutral conductors the direct current limiting means 25 (FIG. 8) comprises a capacitor 29. The capacitor 29, the discharger 26 and the switching apparatus 27 are connected in parallel.

Figure 10:
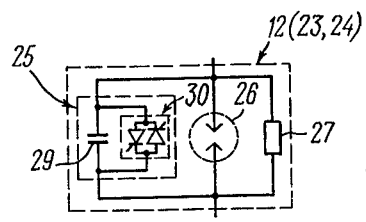
FIG. 10 shows a schematic diagram of a fifth embodiment of the device for preventing the direct current from flowing to the neutral conductors, according to the invention.

In order to simplify and increase the effectiveness of the network the fourth and fifth embodiments of the devices 12, 23, 24 for preventing the direct current from flowing to the neutral conductors are used. In this case the direct current limiting means 25 comprises a thyristor contactor 30 (FIGS. 9 and 10). When the means 25 (FIG. 9) includes the main resistance 28, the thyristor contactor 30 is connected in parallel with the main resistance 28 and limits the voltage of the main resistance 28. When the means 25 (FIG. 10) includes the capacitor 29, the thyristor contactor 30 is connected in parallel with the capacitor 29 and limits the voltage thereof.

Figure 11:
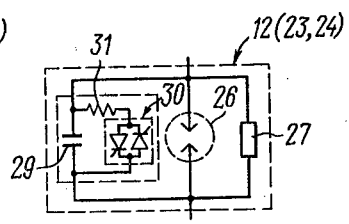
FIG. 11 shows a schematic diagram of a sixth embodiment of the device for preventing the direct current from flowing to the neutral conductors, according to the invention.

In order to raise the operational reliability of the capacitor 29 and the thyristor contactor 30 the direct current limiting means 25 additionally comprises a resistance 31 (FIG. 11). The additional resistance 31 is connected in series with the thyristor contactor 30 and limits the discharge current of the capacitor 29.

Figure 12:
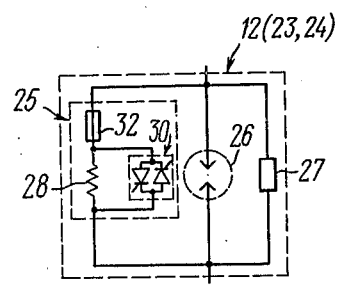
FIG. 12 shows a schematic diagram of a seventh embodiment of the device for preventing the direct current from flowing to the neutral conductors, according to the invention.
Figure 13:
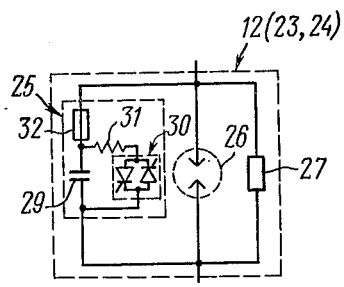
FIG. 13 shows a schematic diagram of an eighth embodiment of the device for preventing the direct current from flowing to the neutral conductors, according to the invention.

In order to ensure thermal stability of the thyristor contactor 30 the seventh and eighth embodiments of the devices 12, 23, 24 for preventing the direct current from flowing to neutrals are used. In these embodiments the direct current limiting means 25 additionally comprises a fuse 32 (FIGS. 12 and 13). When the means 25 (FIG. 12) includes the main resistance 28, the fuse 32 is connected to the neutral conductor (to which each of the devices 12, 23, 24 for preventing the direct current from flowing to the neutral conductors is joined) and to the main resistance 28. When the means 25 (FIG. 13) includes the capacitor 29, the thyristor contactor 30 and the additional resistance 31, the fuse 32 is connected to the neutral conductor (to which each of the devices 12, 23, 24 for preventing the direct current from flowing to the neutral conductors is joined) and to the capacitor 29.

Figure 14:
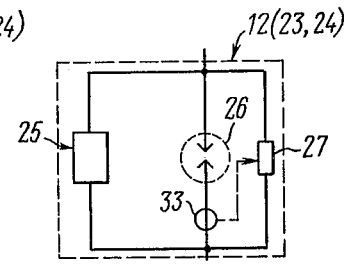
FIG. 14 shows a schematic diagram of a ninth embodiment of the device for preventing the direct current from flowing to the neutral conductors, according to the invention.

The ninth embodiment of the device 12, 23, 24 for preventing the direct current from flowing to the neutral conductors is used in order to ensure operation of said devices 12, 23, 24 in emergency conditions. This embodiment additionally comprises a current sensor 33 (FIG. 14). The current sensor 33 is electrically connected by a first primary tapping to a discharger 26, by the second primary tapping to the switching apparatus 27 and the direct current limiting means 25, and by secondary tappings to the drive of the switching apparatus 27. The current sensor supplies a signal to activate the switching apparatus 27 when current appears in the circuit of the discharger 26.

Figure 15:
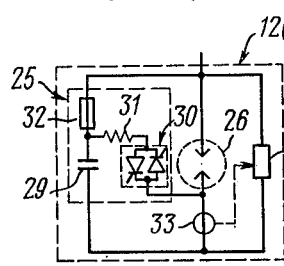
FIG. 15 shows a schematic diagram of a tenth embodiment of the device for preventing the direct current from flowing to neutral conductors, according to the invention.

When the direct current limiting means 25 (FIG. 15) includes the capacitor 29 and the thyristor contactor 30, the current sensor is electrically connected by a first primary tapping to the thyristor contactor 30 and the discharger 26, by a second primary tapping to the switching apparatus 27 and the capacitor 29, and by secondary tappings to the drive of the switching apparatus 27.

Figure 16:
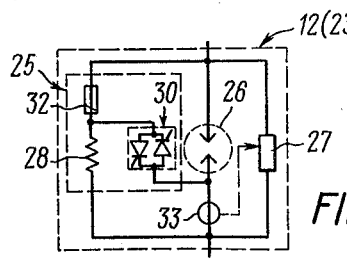
FIG. 16 shows a schematic diagram of an eleventh embodiment of the device for preventing the direct current from flowing to the neutral conductors, according to the invention.

When the direct current limiting means 25 (FIG. 16) includes the main resistance 28 and the thyristor contactor 30, the current sensor 33 is electrically connected by a first primary tapping to the thyristor contactor 30 and the discharger 26, by a second primary tapping to the switching apparatus 27 and the main resistance 28, and by secondary tappings to the drive of the switching apparatus 27.

The high-voltage electrical network, according to the invention, operates as follows.

In order to melt the icing on the circuit 10 (FIG. 1) of the line 2 of the high-voltage network 1, the line 2 is disconnected from the power sources and consumers (not shown). It is possible that only one conductor, whereon the icing is to be melted, is disconnected and the line goes on operating without one phase. When the power source (not shown) of the device 11 for melting the icing on the line of the high-voltage electrical network by direct current is switched on, the melting direct current appears in the ice melting circuit and the circuit 10 of the line 2 is heated. The direct melting current, flowing in the ice melting circuit of the line 2 of the high-voltage electrical network 1, results in a direct voltage drop on the equivalent resistance of the ground circuit 7 between the circuit 7 and the ground. This direct voltage is applied (through the neutral conductor 4 coupled to the ground circuit 7 and the neutral 5 coupled to the ground circuit 8 and thus to the ground) to the still operating part of the high-voltage electrical network 1, that is to the transformers 6 and the line 3. Since the equivalent resistance of the operating part of the high-voltage electrical network 1 is extremely low, a considerable direct current can flow through the neutral conductors 4 and 5 as a result of this direct voltage. This can be the cause of disturbances in normal operation of the high-voltage electrical network 1. In order to prevent the direct current from flowing to the operating part of the high-voltage electrical network, the device 12 for preventing the direct current from flowing to the neutral conductors is connected to the neutral conductor 4, where this flowing can take place. The device 12 for preventing the direct current from flowing to the neutral conductors limits the direct current branching into the neutral conductor 4 to a permissible level, if it comprises the main resistance 28 (FIG. 7), or eliminates the flowing of direct current completely, if it comprises the capacitor 29 (FIG. 8). The resistance of the device 12 (FIG. 1) for preventing the direct current from flowing to the neutral conductors is practically negligible. That is why the grounding conditions of the neutral conductor 4 which is an element of the operating part of the high-voltage electrical network 1, that is the line 3 and the transformers 6, is not changed, when the device 12 for preventing the direct current from flowing to the neutral conductors is connected to this neutral conductor 4. In the embodiment of FIG. 1 of the high-voltage electrical network 1 the device 12 for preventing the direct current from flowing to the neutral conductors is installed only in the neutral conductor 4 joined to the ground circuit 7 used as the operational grounding means. This is sufficient to prevent the direct current from flowing to the operating part of the high-voltage electrical network 1, that is the line 3 and the transformer 6.

In the high-voltage electrical network 1 (FIG. 2) which comprises two ground circuits 7 and 8 used as the operational grounding means, to which the neutral conductors 4 and 5 are joined, a small direct voltage appearing in the ground circuits 7 and 8 is applied to the part of the network 1 operating during ice melting, that is the line 3 and the transformers 6, through the neutral conductors 4 and 5. The device 12 for preventing the direct current from flowing to the neutral conductors, connected to of the neutral conductors 4 and to the ground circuit 7, prevents the direct current from flowing through this neutral conductor 4 and the line 3. This takes place, because the direct current circuit is disconnected or a large resistance is placed therein depending on what elements the device 12 includes. In the high-voltage electrical network 1, wherein the neutral conductor 4 is connected to the ground circuit 8 (FIG. 3), the part which is operating during ice melting, that is the line 3 and the transformers 6, is under a continuous voltage produced as the melting current flows in the equivalent resistance of the ground circuit 8. In this case the operating part of the high-voltage electrical circuit 1 is connected with a direct current source, that is the device 11 for melting the icing on the line of the high-voltage electrical network by direct current, through the disconnected line 2, the ground circuit 8, the neutral conductors 4 and 5 and the ground. When the device 12 for preventing the direct current from flowing to neutrals is connected to the neutral conductors conductor 4 and the ground circuit 8, the direct current, which flows in response to the direct voltage in the ground circuit 8 along a network comprising the neutral conductor 4, the transformer 6, the line 3, another transformer 6, the neutral conductor 5, the ground circuit 9 and the ground, is limited or eliminated completely depending on the elements of the device 12.

When icing is melted by direct current on the line 2 (FIG. 4) of the high-voltage electrical network 1 including four ground circuits 7, 8, 9 and 13, the melting direct current flowing in the heated circuit 10 of the line 2 of the high-voltage electric circuit 1 is divided into the conductor 4 and the lightning protection cable 15 and afterwards comes through different ground circuits 9 and 13, the ground and the ground circuit 7 to the melting source, that is the device 11 for melting the icing on the line of the high-voltage electrical network by direct current. The direct voltage produced as the melting current flows in the equivalent resistance of the ground circuit 7 is applied to the operating part of the high-voltage electrical circuit 1, that is the transformers 6 and the line 3, through the neutral conductors 4 and 5, the ground circuit 8 and the ground. The device 12 for preventing the direct current from flowing to the neutral conductors, which is connected to the neutral conductor 4 and the ground circuit 7, protects the operating part of the high-voltage electrical network 1, that is the transformers 6 and the line 3, against the direct current which could flow therein in response to the direct voltage in the ground circuit 7 applied thereto.

In the high-voltage electrical network 1 (FIG. 5) including five ground circuits 7, 8, 9, 13 and 22 the melting current flows from the direct current source, that is the device 11 for melting the icing on the line of the high-voltage network by direct current, through the melting circuit elements, that is the ground circuits 7, 9 and 13, and produces direct voltage in the equivalent resistances of these ground circuits.

The direct voltage in the ground circuits 7 and 9 is applied through the neutral conductors 4, 19 and 20 joined to said ground circuits, the neutral conductor 5, the ground circuit 8 and the ground, the neutral conductor 21, the ground circuit 22 and the ground to the operating part of the high-voltage electrical network 1, that is the line 2 operating with incomplete phases, the lines 3 and 18 and the transformers 6.

The device 12 for preventing the direct current from flowing to the neutral conductors of the high-voltage electrical network, coupled to the neutral conductor 4 and the ground circuit 7, disconnects the circuit of the direct current flowing in the neutral conductor 4, produced in response to the direct voltage in the ground circuit 7. However, this is not sufficient to eliminate the direct current produced by the direct voltage in the ground circuit 9 and flowing in the circuit comprising the neutral conductor 19, the two conductors 16 and 17 of the line 2, the line 3, the transformers 6, the neutral conductor 5, the ground circuit 8 and the ground. This is also insufficient to prevent the direct current from flowing through the circuit comprising the neutral conductor 20, the transformers 6, the line 18, the neutral conductor 21, the ground circuit 22 and the ground. In order to completely prevent flowing of the direct current to the operating part of the high-voltage electrical network 1, the network comprises two devices 23 and 24 for preventing the direct current from flowing to the neutral conductors 19 and 20 and to the ground circuit 9.

When the neutral conductors 19 and 20 are joined in one point and connected to the ground circuit 9 by one common wire, one device 23 suffices to prevent the direct current from flowing to the neutral conductors between the joint of the neutral conductors 19 and 20 and the ground circuit 9.

Before the power source (not shown) of the device 11 (FIGS. 1–5) for melting the icing by direct current on the line of the high-voltage electrical network 1 is switched on, all the devices 12, 23, 24 for preventing the direct current from flowing to the neutral conductors are set to their operational conditions. For this purpose in the devices 12, 23, 24 (FIG. 6) for preventing the direct current from flowing to the neutral conductors the switching apparatus 27 should be turned off. After the switching apparatus 27 is turned off, each of the the neutral conductors 4, 19, 20 (FIGS. 1–5), to which one of the devices 12, 23, 24 for preventing the direct current from flowing to the neutral conductors is connected, remains coupled to the respective ground circuit 7, 8, 9 through the direct current limiting means 25 (FIG. 6). The direct current limiting means 25 is selected so that its resistance to alternating current is negligible and its resistance to direct current in normal ice melting conditions corresponds to the conditions of limitation of the direct current flowing to neutrals.

When limitation of the direct current flowing to the neutral conductors to a permissible level is sufficient in accordance with the requirements of maintaining normal operating conditions of the high-voltage electrical network 1 (FIGS. 1–5), the direct current limiting means 25 includes the resistance 28 (FIG. 7). When flowing of the direct current to the neutral conductors cannot be tolerated in accordance with the requirements of maintaining normal operating conditions of the high-voltage electrical network 1 (FIGS. 1-5), the direct current limiting means 25 includes the capacitor 29 (FIG. 8). Such selection of the direct current limiting means 25 makes the neutral conductor 4,19,20 (FIGS. 1-5), to which the device 12, 23, 24 for preventing the direct current from flowing to the neutral conductors is connected, practically dead grounded as far as alternating current is concerned both in the premelting condition and during ice melting by direct current.

After the melting is over and the power source (not shown) of the device 11 (FIGS. 1-5) for melting the icing by direct current on the line of the high-voltage network 1 is turned off, all the devices 12, 23, 24 for preventing the direct current from flowing to the neutral conductors are set to the initial position by turning on the switching apparatus 27.

In case of certain breakdowns (for example, short circuits to the ground) of the part of the high-voltage electrical network 1 operating during melting, that is the line 3 and the transformers 6 (FIGS. 1-4), the lines 2, 3, 18 and the transformers 6 (FIG. 5), alternating currents which exceed currents of the normal condition by many fold can flow through all the grounded neutrals 4, 5, 19, 20, 21. The alternating voltage in the resistance 28 (FIG. 7) or the capacitor 29 (FIG. 8) of the direct current limiting means 25 sharply increases. This voltage is applied to the neutral conductor connected to the device 12, 23, 24 including the means 25. In order to avoid damage of the insulation of the transformers 6 connected to the the neutral conductors 4,19,20 (FIGS. 1-5), the devices 12, 23, 24 for preventing the direct current from flowing to the neutral conductors include the discharger 26 (FIG. 6) which limits the voltage and protects the insulation. When the discharger 26 operates, practically all alternating current flowing through the neutral conductors 4,19, 20 (FIGS. 1-5) and the direct current limiting means 25 (FIG. 6) passes through the discharger 26. After the fault is corrected in the operating part of the high-voltage electrical network 1, that is the line 3 and the transformers 6 (FIGS. 1-4), the lines 2, 3, 18 and the transformers 8 (FIG. 5), the arc in the discharger 26 (FIG. 6) can still burn because it is maintained by the direct voltage in the ground circuit used as the operational grounding means which is a part of the ice melting circuit. That is why, after the discharger 26 (FIG. 6) operates, the switching apparatus 27 shunting the arc in the discharger 26 is turned on and the arc is extinguished. In this way the discharger 26 is protected against being destroyed by the arc.

Melting of icing by direct current after turning on of the switching apparatus 27 of the devices 12, 23, 24 for preventing the direct current from flowing to the neutral conductors can be dangerous to the still operating part of the high-voltage electrical network 1, that is the line 3 and the transformers 6 (FIGS. 1-4), the lines 2,3,18 and the transformers 6 (FIG. 5). Here, use should be made of a signalling means indicating the condition of the switching apparatus 27. Or, measures can be taken to turn off the power source (not shown) of the device 11 for melting the icing by direct current on the line of the high-voltage electrical network 1 (FIGS. 1-5) after the switching apparatus 27 is turned on.

When the direct current limiting means 25 (FIGS. 9, 10) includes the resistance 28 or the capacitor 29, the thyristor contactor 30 is connected in parallel with said resistance 28 or the capacitor 29. The thyristor contactor 30 permits reliable protection of the resistance 28 and the capacitor 29 against overloads. This can be done by precise adjustment of the operating voltage of the thyristor contactor 30. The operating voltage of the thyristor contactor 30 is coordinated with the insulation breakdown voltage of the protected resistance 28 or the capacitor 29. When the current passing through the resistance 28 or the capacitor 29 of the direct current limiting means 25 grows dangerously, the voltage in these elements also grows and can damage them. When this voltage reaches the level of the operating voltage of the thyristor contactor 30, the contactor operates, that is, it becomes conductive and shunts the resistance 28 or the capacitor 29.

The additional resistance 31 (FIG. 11) provided in the circuit of the thyristor contactor 30, if the direct current limiting means 25 includes the capacitor 29, protects the thyristor contactor 30 against the discharge current of the capacitor 29 jumping during the operation of the thyristor contactor 30.

The fuse 32 (FIGS. 12 and 13) in the direct current limiting means 25 ensures reliable protection of the main resistance 28, the capacitor 29 and the thyristor contactor 30 against alternating emergency overcurrents in case the thermal stability of these elements is lowered due to engineering and economical considerations. The devices 12, 23, 24 for preventing the direct current from flowing to the neutral conductors made in this way operate in the normal conditions of ice melting by direct current like the above described devices. In emergency conditions, after the thyristor contactor 30 operates and before the thyristor contactor 30 and the resistance 28 or the capacitor 29 shunted thereby can be damaged by the thermal action of the emergency alternating current, the fuse 32 operates and open circuits the current of this circuit. The recovery voltage of the fuse 32 in this case is applied to the discharger 26 which operates as a result and again connects the neutral conductor joined to said device 12,23,24 to the ground through the arc struck therein. The switching apparatus 27 is then turned on like in the previous embodiments of the devices 12, 23, 24 for preventing the direct current from flowing to the neutral conductors. In order to ensure control of suddenly appearing emergency conditions of the devices 12, 23, 24 for preventing the direct current from flowing to the neutral conductors, they comprise the current sensor 33 (FIG. 14). This current sensor 33 maintains control over the operating conditions in the devices 12,23,24 for preventing the direct current from flowing to the neutral conductors by the presence of current in the circuit of the discharger 26. The discharger 26 operates, when the alternating voltage of the neutral conductor to which one of the devices 12,23,24 is connected, is increased. After the discharger 26 operates, current is produced in its circuit and it is registered by the current sensor 33. The current sensor starts formation of a signal for turning on the switching apparatus 27. When the devices 12, 23, 24 for preventing the direct current from flowing to the neutral conductors include the thyristor contactor 30 (FIGS. 15,16), the emergency current is registered by the presence of current in the circuit of the discharger 26 and the thyristor contactor 30. Thus, the signal to turn on the switching apparatus 27 is produced when the thyristor contactor operates or the discharger 26 operate, or when they operate together. In this manner a greater reliability of operation of the devices 12, 23, 24 for preventing the direct current from flowing to neutrals is obtained.

What is claimed is:

1. A high-voltage electrical network comprising:

a plurality of lines of said high-voltage electrical network, each line having several circuits, one of said plurality of lines having a heated circuit whereon the icing is melted;
neutral conductors of said high-voltage electrical network, at least two of said neutral conductors being grounded;
at least two ground circuits, at least one of said ground circuits being connected to one of said neutral conductors and serving as a first operational grounding means and another ground circuit serving as a second operational grounding means;
a device for melting the icing on one of said lines by the use of a direct current, connected to said heated circuit of one of said lines and to one of said ground circuits,
said heated circuit of one of said lines, said two ground circuits serving as said first and second operational grounding means, said device for melting the icing on one of said lines and the ground serving as a return conductor being connected in series to one another and forming a circuit for melting the icing on one of said lines; and
a device connected to one of said neutral conductors and also connected to an associated ground circuit for preventing the direct current from flowing to said neutral conductors.

2. A high-voltage electrical network as claimed in claim 1, wherein said device for preventing the direct current from flowing to said neutral conductors of the high-voltage electrical network comprises:
a direct current limiting device connected to one of said neutral conductors and to said associated dground circuit;
a discharger connected to one of said neutral conductors and to said associated ground circuit for limiting the voltage of said one of said neutral conductors; and
a switching apparatus having a drive connected to one of said neutral conductors and to said associated ground circuit and preventing breakdown of said discharger during operation.

3. A high-voltage electrical network as claimed in claim 2, in which said direct current limiting device comprises a resistance.

4. A high-voltage electrical network as claimed in claim 2, in which said direct current limiting device comprises a capacitor.

5. A high-voltage electrical network as claimed in claim 3, in which said direct current limiting device comprises a thyristor contactor connected to one of said neutral conductors and to said associated ground circuit and limits the voltage in said resistance.

6. A high-voltage electrical network as claimed in claim 4, in which said direct current limiting device comprises a thyristor contactor connected to one of said neutral conductors and to said associated ground circuit and limits the voltage on said capacitor.

7. A high-voltage electrical network as claimed in claim 6, comprising a resistance coupled to said thyristor contactor and one of said neutral conductors and limits the discharge current of said capacitor.

8. A high-voltage electrical network as claimed in claim 3, in which said direct current limiting device comprises a fuse connected to one of said neutral conductors and to said resistance.

9. A high-voltage electrical network as claimed in claim 4, in which said direct current limiting device comprises a fuse connected to one of said neutral conductors and to said capacitor.

10. A high-voltage electrical network as claimed in claim 5, in which said direct current limiting device comprises a fuse connected to one of said neutral conductors to said resistance and to said thyristor contactor.

11. A high-voltage electrical network as claimed in claim 6, in which said direct current limiting device comprises a fuse connected to one of said neutral conductors to said capacitor and to said thyristor contactor.

12. A high-voltage electrical network as claimed in claim 7, in which said direct current limiting device comprises a fuse connected to one of said neutral conductors to said capacitor and to said resistance.

13. A high-voltage electrical network as claimed in claim 2, in which said device for preventing the direct current from flowing to said neutral conductors comprises a current sensor having a first primary tapping, a second primary tapping and n secondary tappings, which is connected by its first primary tapping to said discharger, by its second primary tapping to said switching apparatus and said direct current limiting device, and by its n secondary tappings to a drive of said switching apparatus for supplying a signal to turn on said switching apparatus.

14. A high-voltage electrical network as claimed in claim 3, in which the device for preventing the direct current from flowing to said neutral conductors comprises a current sensor having a first primary tapping, a second primary tapping and n secondary tappings, which is connected by its first primary tapping to said discharger, by its second primary tapping to said switching apparatus and said resistance, and by its n secondary tappings to a drive of said apparatus for supplying a signal to turn on said switching apparatus.

15. A high-voltage electrical network as claimed in claim 4, in which the device for preventing the direct current from flowing to said neutral conductors comprises a current sensor having a first primary tapping, a second primary tapping and n secondary tappings, which is connected by its first primary tapping to said discharger, by its second primary tapping to said switching apparatus and said capacitor, and by its n secondary tappings to a drive of said switching apparatus for supplying a signal to turn on said switching apparatus.

16. A high-voltage electrical network as claimed in claim 5, in which the device for preventing the direct current from flowing to said neutral conductors comprises a current sensor having a first primary tapping, a second primary tapping and n secondary tappings, which is connected by its first primary tapping to said discharger and said thyristor contactor, by its second primary tapping to said switching apparatus and said resistance, and by its n secondary tappings to, a drive of said switching apparatus for supplying a signal to turn on said switching apparatus.

17. A high-voltage electrical network as claimed in claim 6, in which the device for preventing the direct current from flowing to said neutral conductors comprises a current sensor having a first primary tapping, a second primary tapping and n secondary tappings, which is connected by its first primary tapping to said discharger and said thyristor contactor, by its second primary tapping to said switching apparatus and said capacitor, and by its n secondary tappings to a drive of said switching apparatus for supplying a signal to turn on said switching apparatus.

18. A high-voltage electrical network as claimed in claim 7, in which the device for preventing the direct current from flowing to said neutral conductors comprises a current sensor having a first primary tapping, a second primary tapping and n secondary tappings, which is connected by its first primary tapping to said discharger and said thyristor contactor, by its second primary tapping to said switching apparatus and said capacitor, and by its n secondary tappings to a drive of said switching apparatus for supplying a signal to turn on said switching apparatus.

19. A high-voltage electrical network as claimed in claim 8, in which the device for preventing the direct current from flowing to said neutral conductors comprises a current sensor having a first primary tapping, a second primary tapping and n secondary tappings, which is connected by its first primary tapping to said discharger, by its second primary tapping to said switching apparatus and said resistance, and by its n secondary tappings to a drive of said switching apparatus for supplying a signal to turn on said switching apparatus.

20. A high-voltage electrical network as claimed in claim 9, in which the device for preventing the direct current from flowing to said neutral conductors comprises a current sensor having a first primary tapping, a second primary tapping and n secondary tappings, which is connected by its first primary tapping to said discharger, by its second primary tapping to said switching apparatus and said capacitor, and by its secondary tappings to a drive of said switching apparatus for supplying a signal to turn on said switching apparatus.

* * * * *